July 23, 1968 J. H. MINER 3,394,269

GROUND LOOP SIGNAL CANCELLATION

Filed Dec. 21, 1964 2 Sheets-Sheet 1

INVENTOR.
JESSE H. MINER
BY [signature]
[signature]
ATTYS.

GROUND LOOP SIGNAL CANCELLATION

Filed Dec. 21, 1964 2 Sheets-Sheet 2

INVENTOR.
JESSE H. MINER
BY
ATTYS.

United States Patent Office 3,394,269
Patented July 23, 1968

3,394,269

GROUND LOOP SIGNAL CANCELLATION

Jesse H. Miner, Falls Church, Va., assignor to the United States of America as represented by the Secretary of the Navy Filed Dec. 21, 1964, Ser. No. 420,224
4 Claims. (Cl. 307—229)

The invention described herein may be manufactured and used by or for the Government of the United States of America for governmental purposes without the payment of any royalties thereon or therefor.

The present invention relates to a system for the cancellation of ground loop potentials and more particularly to a circuit for eliminating ground loop effects in a system employing low level intelligence signals.

The desirability of eliminating ground loop potentials in systems employing low level intelligence signals has been established. Very briefly, ground loop currents and their associated potentials interfere with low level intelligence signals because the associated potential of the ground loop currents can have the same or greater magnitude than the signals of interest. Therefore, the ground loop current is a serious limitation on the sensitivity of a wire or coaxial transmission systems. In systems where the signals of interest are from two to twenty times the magnitude of the associated potential of the ground loop currents, the associated potential of the ground loop currents appears as noise in the system and therefore can cause the difficulties which are associated with systems containing noise.

The present invention eliminates the aforementioned problem by eliminating the effects produced by ground loops. To this end the total signal appearing on an outer conductor of a coaxial cable is subtracted from the total signal on the center conductor which is the intelligence signal of interest and the ground loop potential. The resultant product of the subtraction is the desired intelligence signal. This is possible because it has been found that if the outer conductor of a coaxial cable is disconnected from ground at the signal destination end, the ground loop potential measurable on the outer conductor at the aforementioned end will be approximately equal in phase and magnitude to the ground loop potential found on the center conductor at this end.

An object of the invention is to provide a circuit for eliminating the ground loop potential from a system employing low level intelligence signal.

Another object of the invention is to provide a circuit whose operation is independent of the frequency of the low level intelligence signal for eliminating the ground loop potential from the system employing low level intelligence.

A further object of the invention is to provide a means for increasing the distance a low level intelligence signal can be transmitted over a wire or coaxial transmission line.

Other objects and many of the attendant advantages of this invention will be readily appreciated as the same becomes better understood by reference to the following detailed description when considered in connection with the accompanying drawings wherein.

Figure 1:
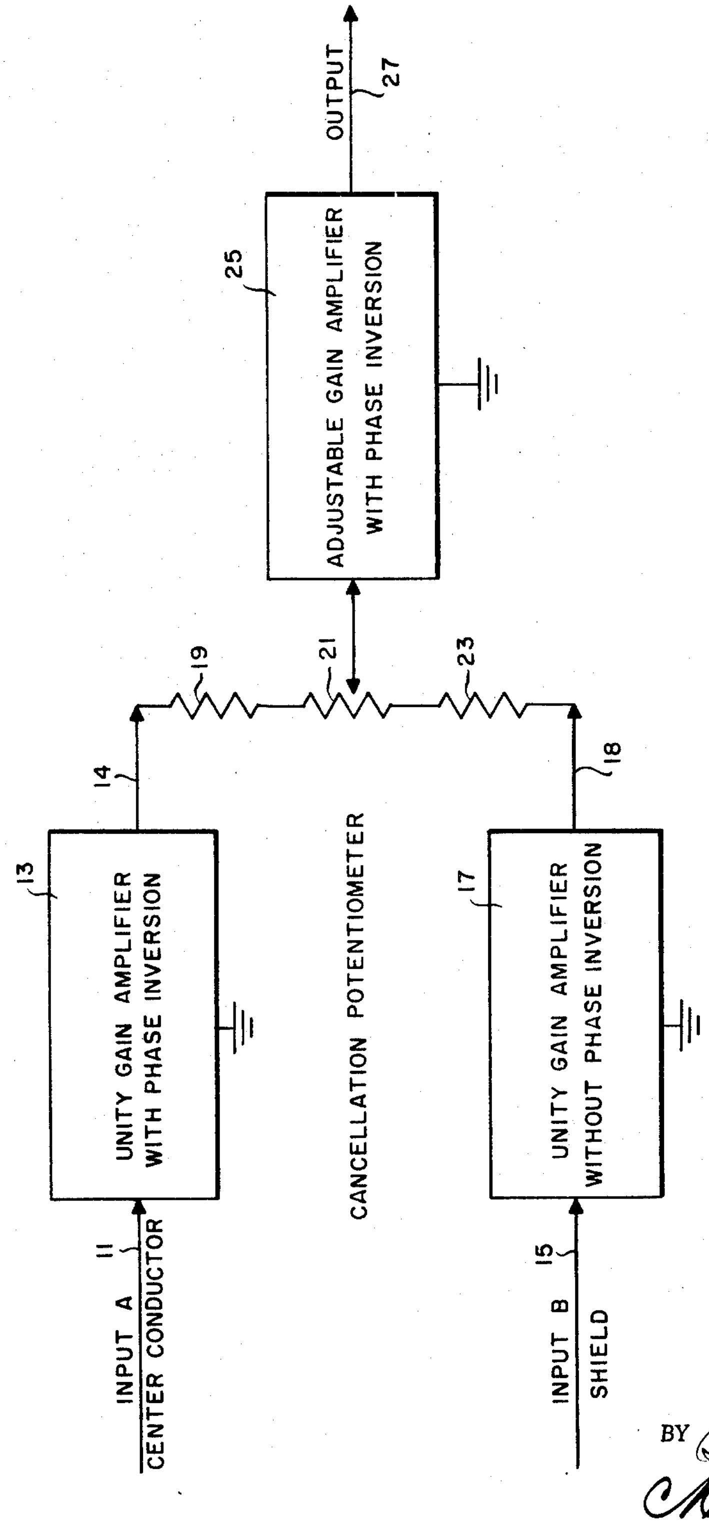
FIG. 1 is a block diagram of a ground loop cancellation system in accordance with the invention.

Referring to FIG. 1 the center conductor 11 of a non-illustrated coaxial cable is connected to the input of a unity gain amplifier 13. The output of the unit gain amplifier 14 is phase inverted. The shield of the coaxial cable is connected to the input 15 of the second unity gain amplifier 17. The output of the unity gain amplifier 18 is taken without phase inversion. The output 14 of unity gain amplifier 13 is connected to one end of a resistor 19 and the output of the unity gain amplifier 18 is connected to one end of a resistor 23. Resistor 19 has its other end connected to a potentiometer 21. The other end of potentiometer 21 is connected to the other end of resistor 23.

Before discussing the operation of the ground loop cancellation system the method of calibrating the system will be first illustrated. Input 11 of the unity gain amplifier 13 and input B of the unity gain amplifier 17 are both connected to a voltage source of a given pre-selected value. The pot 21 is adjusted for a zero output voltage on the output 27 of the adjustable gain amplifier 25. It is to be noted however there is a possibility of merely having a minimum output in the event the potentiometer 21 does not have a fine enough adjustment. A further adjustment is available, by connecting the input 15 of the unity gain amplifier 17 to ground and simultaneously placing a one volt signal on the input 11 of the unity gain amplifier 13. The setting of the potentiometer 21 is not adjusted at all. The adjustable gain amplifier 25 is then adjusted to have a one volt output. This assures that the value of the signal of interest placed on input 11 of the unity gain amplifier 13 is substantially equal to output signal appearing on output 27 of the adjustable gain amplifier 25.

Figure 2:
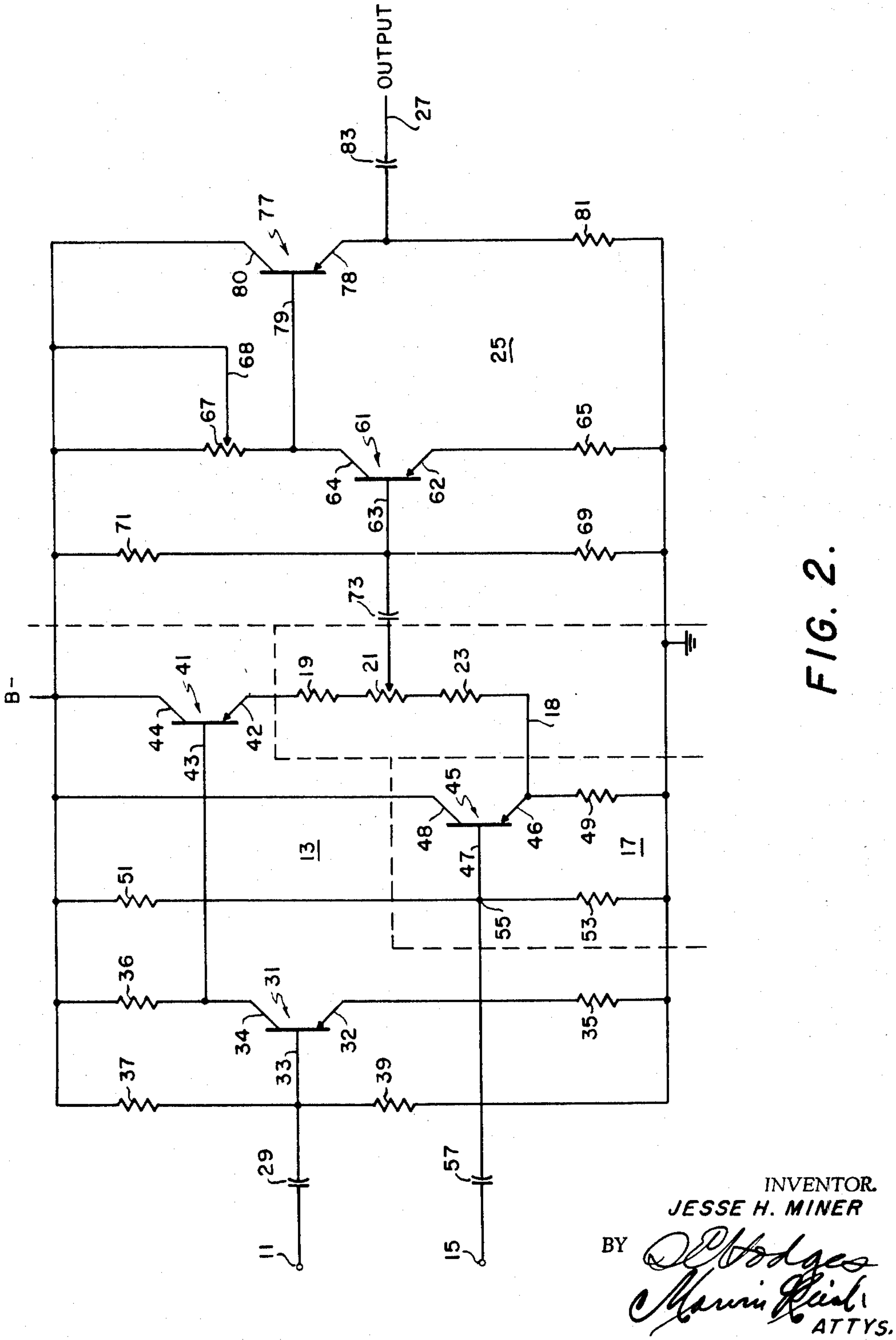
FIG. 2 is a circuit diagram of a ground loop cancellation system in accordance with the invention.

Referring to FIG. 2, common components in FIG. 2 as appear in FIG. 1 contain the same numerical indicia. The input 11 of the unity gain amplifier 13 contains a first condenser 29 for the purpose of isolating any DC potential that appears on the transmission cable from the base of a transistor 31. The first transistor 31 having an emitter electrode 32, a base electrode 33 and a collector electrode 34 has its emitter electrode 32 connected to ground through a first resistor 35. The collector electrode 34 is connected to B— through a resistor 36. A voltage divided network comprising resistors 37 and 39 are connected in series between B— and ground. The base electrode 33 of transistor 31 is connected to junction point of resistors 37 and 39. The input condenser 29 is also connected to this junction point. A second transistor 41 having an emitter electrode 42, a base electrode 43 and a collector electrode 44 has its collector electrode 44 connected to B—. Transistors 31 and 41 form the unity gain amplifier with phase inversion 13 of the system illustrated in FIG. 1. The output 14 of the unity gain amplifier 13 is taken from the emitter electrode 42 of transistor 41. The base electrode 43 of transistor 41 is connected to the collector electrode 34 of transistor 31.

Transistor 45 having an emitter electrode 46, a base electrode 47, and a collector electrode 48 has its emitter electrode 46 connected to one end of resistor 49. The other end of resistor 49 is connected to ground. The base electrode 47 of the transistor 45 is connected to a junction point 55. The collector electrode 48 of transistor 45 is directly connected to B—. A first resistor 51 has one end connected to B— and its other end connected to terminal 55. A second resistor 53 has one end connected to ground and its other end connected to junction point 55. A condenser 57 connects the input terminal 15 of the unity gain amplifier 17 to the junction point 55.

The adjustable gain amplifier 25 contains a first transistor 61 having an emitter electrode 62, a base electrode 63, and a collector electrode 64. The emitter electrode 62 is connected to one end of a resistor 65, the other end of resistor 65 is connected to ground. The collector electrode 64 of transistor 61 is connected to one end of a potentiometer 67, the other end of potentiometer 67 is connected to the source of B— potential. A variable tap 68 is connected directed to the minus. A first resistor 69 and a second resistor 71 are connected in series forming a voltage divider. The base electrode 63 of transistor 61 is connected to the junction point of resistor 69 and 71. A condenser 73 is connected betwen the center tap of potentiometer 21 and the junction point of resistor 69 and 71. A second transistor 77 having an emitter electrode 78, a base electrode 79, and a collector electrode 80 having its emitter electrode 78 connected to one end of a resistor 81. The other end of resistor 81 is connected to ground. The collector electrode 80 of transistor 77 is directly connected to B—.

The base electrode 79 of transistor 77 is connected to the collector electrode 64 of the transistor 61. The output of the adjustable gain amplifier 25 is obtained through a capacitor 83 from the emitter electrode 78 of the transistor 77.

The operation of FIG. 2 will be described in conjunction with the operation of FIG. 1 noting that FIG. 2 is calibrated exactly in the same fashion as in FIG. 1. The output of the adjustable gain amplifier 25 is controlled by varying the value of the potentiometer 67. The signal on the center conductor of the coaxial cable is amplified and inverted by transistor 31. Transistor 41 couples the amplified signal from the collector of transistor 31 to the output terminal 14 of the unity gain amplifier 13. The signal which appears on the shield of the coaxial cable is coupled by transistor 45 to the output 18 of the unity gain amplifier 17. It is to be noted that the output of an emitter follower transistor amplifier is substantially the same as the input and therefore for all practical purposes an emitter follower may be considered to be a unity gain device. The signal or potential generated as a result of the ground loop is cancelled in resistors 19, 21 and 23 because the signal on terminal 11 has been inverted and the signal on terminal 15 has not been inverted. The signal of interest appears only on the center conductor of the coaxial cable which is connected to terminal 11 and not on the outer conductor of the coaxial cable which is conneted to terminal 15. The inverted signal appearing on terminal 14 is added to the noninverted signal appearing on terminal 18 through the combination of resistances 19, 21 and 23. Since one of the signals has been inverted then the result of the addition is a subtraction and the remainder is merely the signal of interest. The signal of interest is then amplified by transistor 61 and coupled to the output terminal by transistor 77.

By way of illustration only and not for purposes of limitation the value of the components utilized to build a labaratory embodiment the invention will be listed below:

| | |
|---|---|
| Transistor 31 | 2N414. |
| Transistor 41 | 2N414. |
| Transistor 45 | 2N414. |
| Transistor 51 | 2N414. |
| Transistor 77 | 2N414. |
| Condenser 29 | 30 μf.—6 v. |
| Condenser 57 | 30 μf.—6 v. |
| Condenser 73 | 30 μf.—6 v. |
| Condenser 83 | 10 μf.—25 v. |

| | |
|---|---|
| Resistor 37 | 75K ohms. |
| Resistor 39 | 33K ohms. |
| Resistor 36 | 750 ohms. |
| Resistor 35 | 750 ohms. |
| Resistor 51 | 39K ohms. |
| Resistor 53 | 33K ohms. |
| Resistor 49 | 750 ohms. |
| Resistor 19 | 1.5K ohms. |
| Potentiometer 21 | 500 ohms. |
| Resistor 23 | 1.5K ohms. |
| Resistor 71 | 120K ohms. |
| Resistor 69 | 33K ohms. |
| Potentiometer 67 | 5K ohms. |
| Resistor 65 | 1.6K ohms. |
| Resistor 81 | 2K ohms. |

Obviously many modifications and varations of the present invention are possible in the light of the above teachings. It is therefore to be understood that within the scope of the appended claims the invention may be practiced otherwise than as specifically described.

What is claimed is:

1. Apparatus for cancelling potential generated by ground loops in transmission systems from low level intelligence signals comprising:

a first transistor having an emitter electrode a base electrode and a collector electrode;

a second transistor having an emiter electrode, a base electrode and a collector electrode, said second transistor's base electrode being connected to said first transistor's collector electrode;

a first common junction point, said emitter electrode of said first transistor being connected to said first common junction point;

a second common junction point, said second transistor's collector electrode being connected to said second common junction point;

a third transistor having an emitter electrode, a base electrode, and a collector electrode, said third transistor's collector electrode being connected to said second common juntion point;

a first resistor, said first resistor connecting said third transistor's emitter electrode to said first common junction point;

a potentiometer having first and second end terminals and a wiper terminal, said potentiometer's first end terminal being connected to said second transistor's emitter electrode, and said potentiometer's second end terminal being connected to said third transistor's emitter electrode;

a fourth transistor having an emitter electrode, a base electrode and a collector electrode, said fourth transistor's base electrode being connected to said potentiometer's wiper terminal, said fourth transistor's emitter electrode being connected to said first common junction point; and a variable impedance connected between said second common junction point and said fourth transistor's collector electrode whereby the signal present on the base electrode of said third transistor is subtracted from the signal present on the base electrode of said first transistor.

2. Apparatus for cancelling potentials generated by ground loops in transmission systems from low level intelligence signals as defined in claim 1 but further characterized by having a fifth transistor, said transistor having a base electrode connected to said fourth transistor's collector electrode, said fifth transistor having a collector electrode connected to said second common junction point and said fifth transistor having an emitter electrode resistively connected to said first common junction point.

3. Apparatus for cancelling potential generated by ground loops in transmission systems from low level intelligence signals as defined in claim 2 but further characterized by having a coaxial cable, said coaxial cable having a center conductor and an outer conductor, said center conductor being connected to said first transistor's base electrode and said outer conductor being connected to said third transistor's base electrode.

4. Apparatus for cancelling potential generated by ground loops in transmission systems from low level intelligence signals as defined in claim 1 but further characterized by having a coaxial cable, said coaxial cable having a center conductor and an outer conductor, said center conductor being connected to said first transistor's base electrode and said outer conductor being connected to said third transistor's base electrode.

References Cited

UNITED STATES PATENTS

| | | | |
|---|---|---|---|
| 3,047,804 | 7/1962 | Peer et al. | 333—12 X |
| 3,308,309 | 3/1967 | Wichmann | 307—88.5 |

JOHN S. HEYMAN, *Primary Examiner.*